United States Patent
Cummings et al.

(12) 
(10) Patent No.: US 6,223,772 B1
(45) Date of Patent: May 1, 2001

(54) DUAL FUNCTION VALVE ASSEMBLY

(75) Inventors: Larry Donald Cummings, Clarence; Taylor R. Eckstein, Jr., N. Tonawanda, both of NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/504,564

(22) Filed: Feb. 15, 2000

(51) Int. Cl.$^7$ .................................................. E03B 11/01
(52) U.S. Cl. ................... 137/595; 137/597; 251/129.11; 251/267; 165/42; 165/43; 62/528; 62/527
(58) Field of Search ..................................... 137/597, 595; 251/129.11, 263; 165/42, 43; 62/528, 527

(56) References Cited

U.S. PATENT DOCUMENTS

| | | | |
|---|---|---|---|
| 4,949,779 | * | 8/1990 | Kenny et al. ........................ 165/203 |
| 5,035,262 | * | 7/1991 | Schweikert ........................... 137/607 |
| 5,127,576 | * | 7/1992 | Weatherhead et al. .............. 237/2 A |
| 5,582,236 | * | 12/1996 | Eike et al. ............................. 165/43 |

* cited by examiner

Primary Examiner—A. Michael Chambers
Assistant Examiner—Thomas L. McShane
(74) Attorney, Agent, or Firm—Patrick M. Griffin

(57) ABSTRACT

A valve assembly for controlling the flow of refrigerant and coolant through an HVAC system is provided. The valve assembly includes a refrigerant housing defining a refrigerant conduit with a refrigerant inlet and a refrigerant outlet. A refrigerant valve is disposed within the refrigerant conduit for controlling the flow of refrigerant between the refrigerant inlet and the refrigerant outlet. The assembly also includes a coolant housing defining a coolant conduit with a coolant inlet and a coolant outlet. A coolant valve is disposed within the coolant conduit for controlling the flow of coolant between the coolant inlet and the coolant outlet. An actuator assembly is coupled to the refrigerant and the coolant valves for simultaneously actuating the valves.

22 Claims, 7 Drawing Sheets

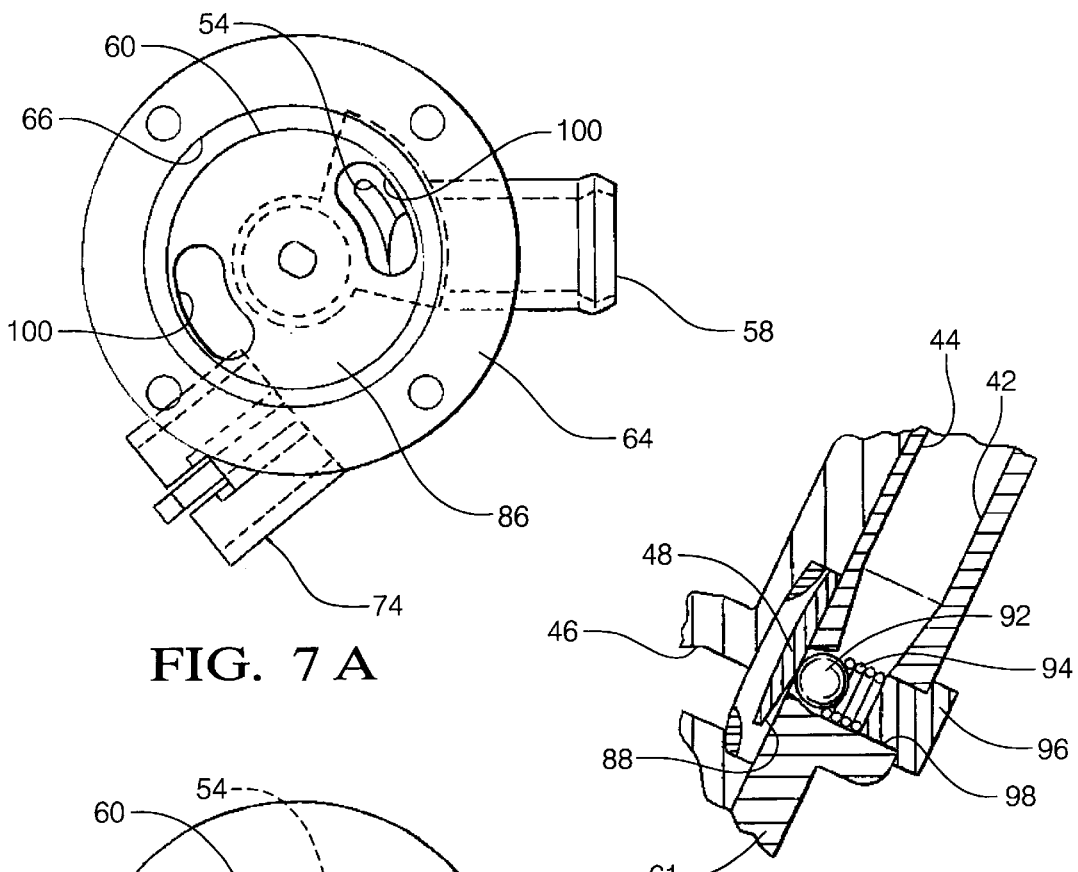
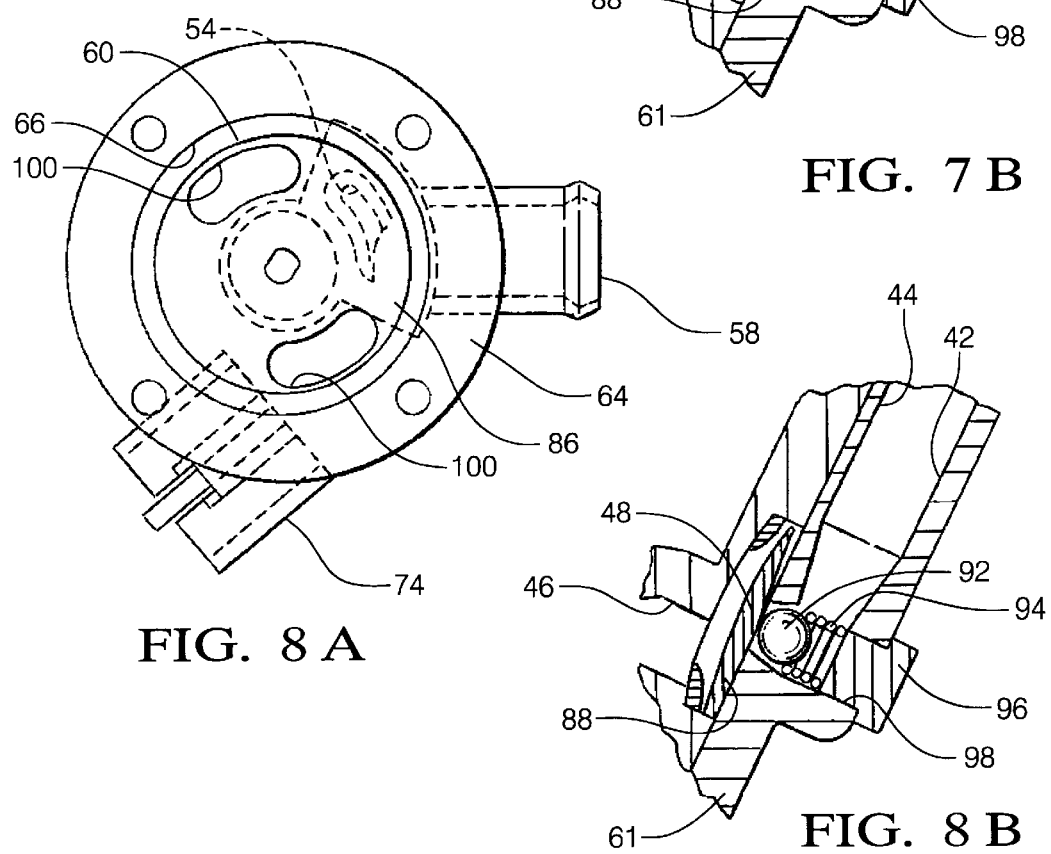

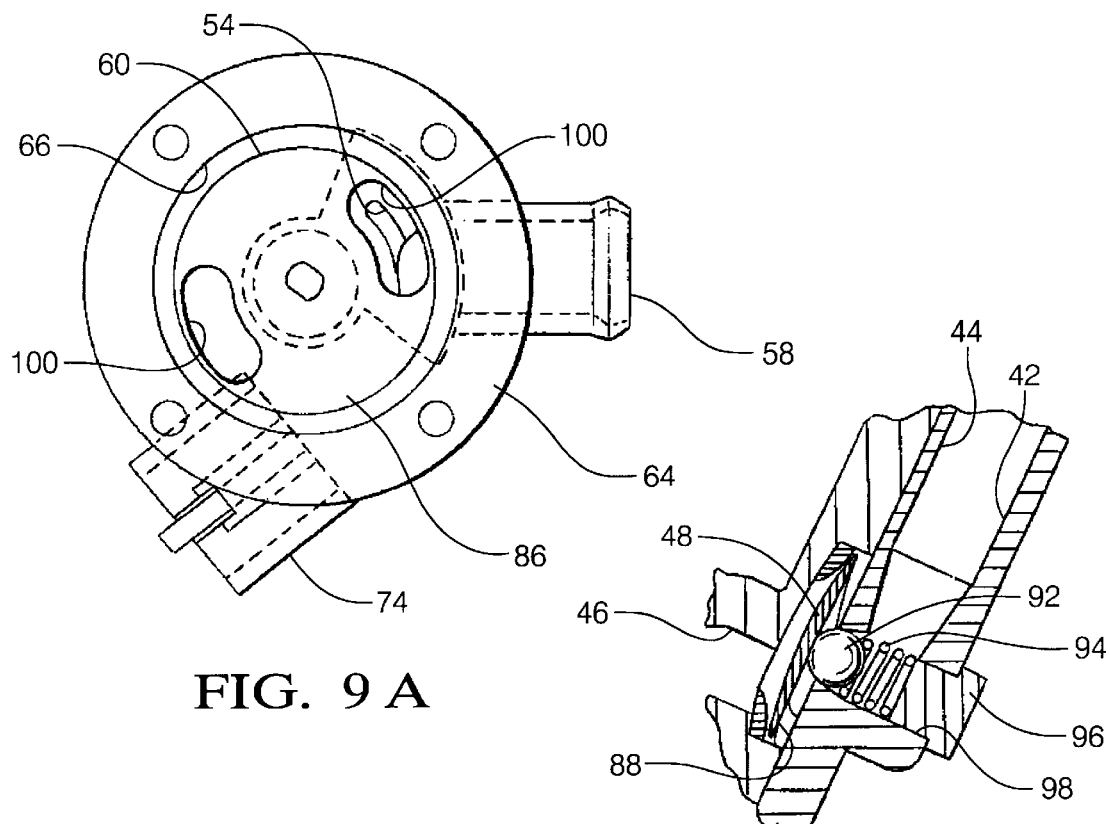
FIG. 9 A
FIG. 9 B
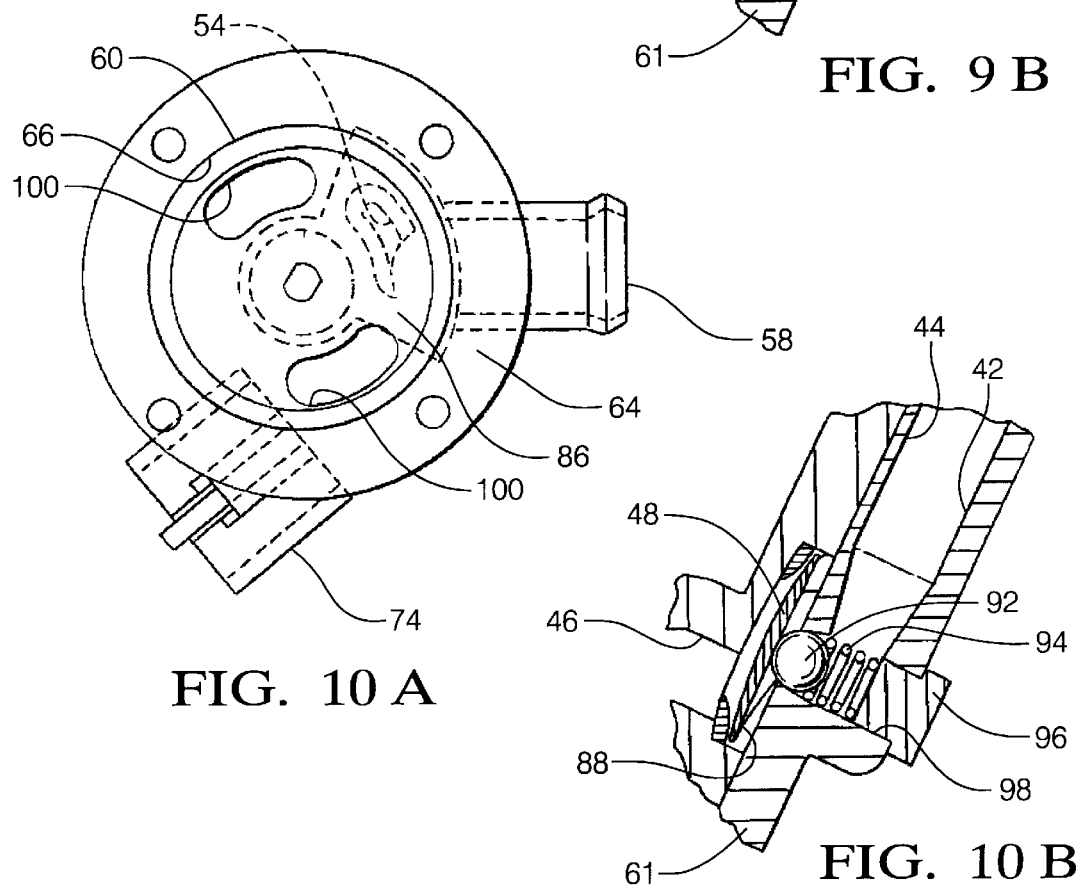
FIG. 10 A
FIG. 10 B

DUAL FUNCTION VALVE ASSEMBLY

TECHNICAL FIELD

The present invention relates to a valve assembly for an HVAC system, and more specifically, the invention relates to valve assembly that is capable of simultaneously controlling the flow of refrigerant and coolant to a rear module of an HVAC system.

BACKGROUND OF THE INVENTION

Heating, ventilation, and cooling (HVAC) systems are becoming increasingly sophisticated in an effort to provide improved climate control in a vehicle cabin. At the same time, there are efforts to reduce the number of components and cost. Furthermore, there are efforts to minimize power consumption for vehicles, which are becoming increasingly electronically controlled and power dependent. One HVAC improvement over the years has utilized a rear module that provides separate controls for climate control of the rear of the vehicle's cabin. The rear modules cooperate with a valve assembly that typically utilizes separately controlled valves to regulate the flow of refrigerant and coolant to the rear module. Typically, the coolant valve has a butterfly valve that is actuated using a vacuum actuator. The refrigerant valve usually uses a solenoid that requires continuous power to maintain the valve in either a normally open or closed position. The refrigerant and coolant valves require separate controls having many components and use a significant amount of power. What is needed is an improved valve assembly that reduces the number of components, cost, and power consumption.

SUMMARY OF THE INVENTION

The present invention provides a valve assembly for controlling the flow of refrigerant and coolant through an HVAC system. The valve assembly includes a refrigerant housing defining a refrigerant conduit with a refrigerant inlet and a refrigerant outlet. A refrigerant valve is disposed within the refrigerant conduit for controlling the flow of refrigerant between the refrigerant inlet and the refrigerant outlet. The assembly also includes a coolant housing defining a coolant conduit with a coolant inlet and a coolant outlet. A coolant valve is disposed within the coolant conduit for controlling the flow of coolant between the coolant inlet and the coolant outlet. An actuator assembly is coupled to the refrigerant and the coolant valves for simultaneously actuating the valves.

Accordingly, the present invention provides an improved valve assembly that reduce the number of components, cost, and power consumption.

BRIEF DESCRIPTION OF THE DRAWINGS

FIG. 7A is a cross-sectional view taken along line A—A in FIG. 3 with the coolant valve in a first operational position;

FIG. 7B is a cross-sectional view taken along line B—B in FIG. 2 with the refrigerant valve in the first operational position;

FIG. 8A is a cross-sectional view taken along line A—A in FIG. 3 with the coolant valve in a second operational position;

FIG. 8B is a cross-sectional view taken along line B—B in FIG. 2 with the refrigerant valve in the second operational position;

FIG. 9A is a cross-sectional view taken along line A—A in FIG. 3 with the coolant valve in a third operational position;

FIG. 9B is a cross-sectional view taken along line B—B in FIG. 2 with the refrigerant valve in the third operational position;

FIG. 10A is a cross-sectional view taken along line A—A in FIG. 3 with the coolant valve in a fourth operational position; and FIG. 10B is a cross-sectional view taken along line B—B in FIG. 2 with the refrigerant valve in the fourth operational position.

DESCRIPTION OF THE PREFERRED EMBODIMENT

Figure 1:
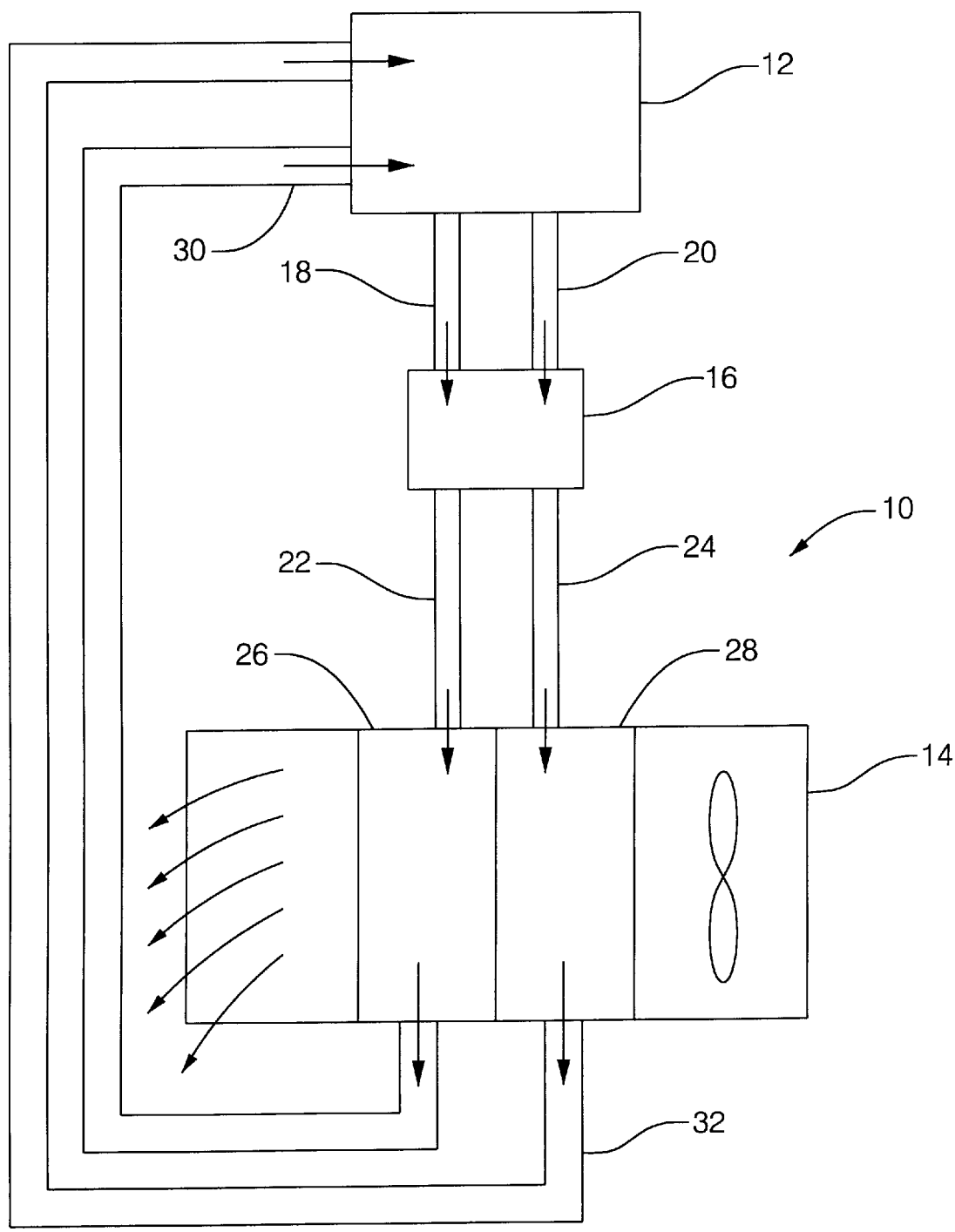
FIG. 1 is a partial schematic view of an HVAC system utilizing the present invention.

With reference to FIG. 1, an HVAC system 10 has main HVAC components 12 well know in the art, such as a radiator, condenser, evaporator, compressor, fan, and other components, for controlling the climate in a vehicle cabin. System 10 has a rear module 14 for providing climate control at the rear of the vehicle cabin. A valve assembly 16 is used to control the flow of refrigerant and coolant from main HVAC components 12 to rear module 14 to provide localized control of the rear climate. Coolant 18 and refrigerant 20 inlet lines provide the coolant and refrigerant from main HVAC components 12 to valve assembly 16. Coolant 22 and refrigerant 24 outlet lines provide the coolant and refrigerant from valve assembly 16 to a rear heater core 26 and a rear evaporator core 28, respectively, when valve assembly 16 is actuated to permit the flow of fluid. Coolant 30 and refrigerant return lines recirculate the coolant and refrigerant to main HVAC components 12 for cooling the front of the vehicle cabin. Lines 18, 20, 22, 24, 30, 32 are typically routed along the underbody of the vehicle.

Figure 2:
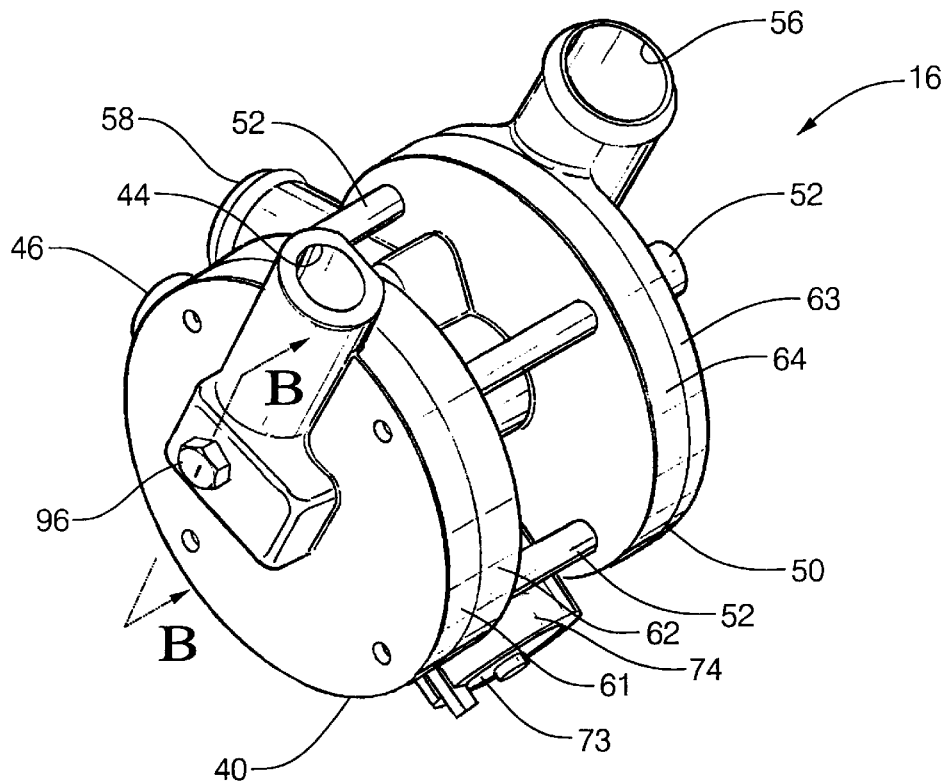
FIG. 2 is a front perspective view of the present invention valve assembly having a refrigerant and coolant valve.
Figure 3:
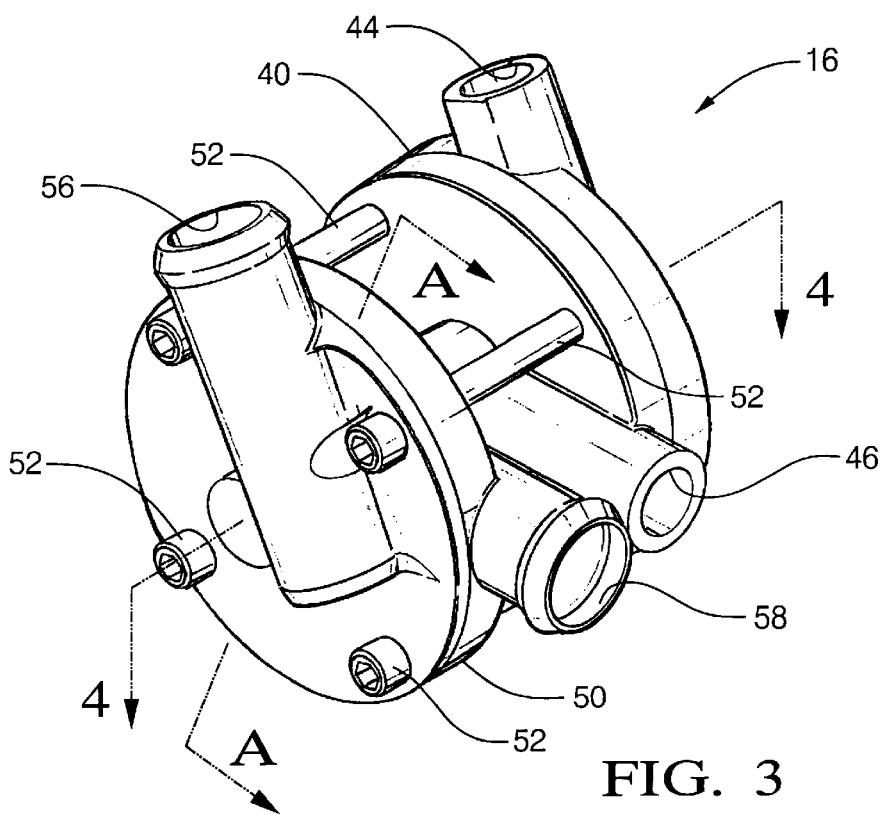
FIG. 3 is a rear perspective view of the valve assembly as shown in FIG. 2.
Figure 4:
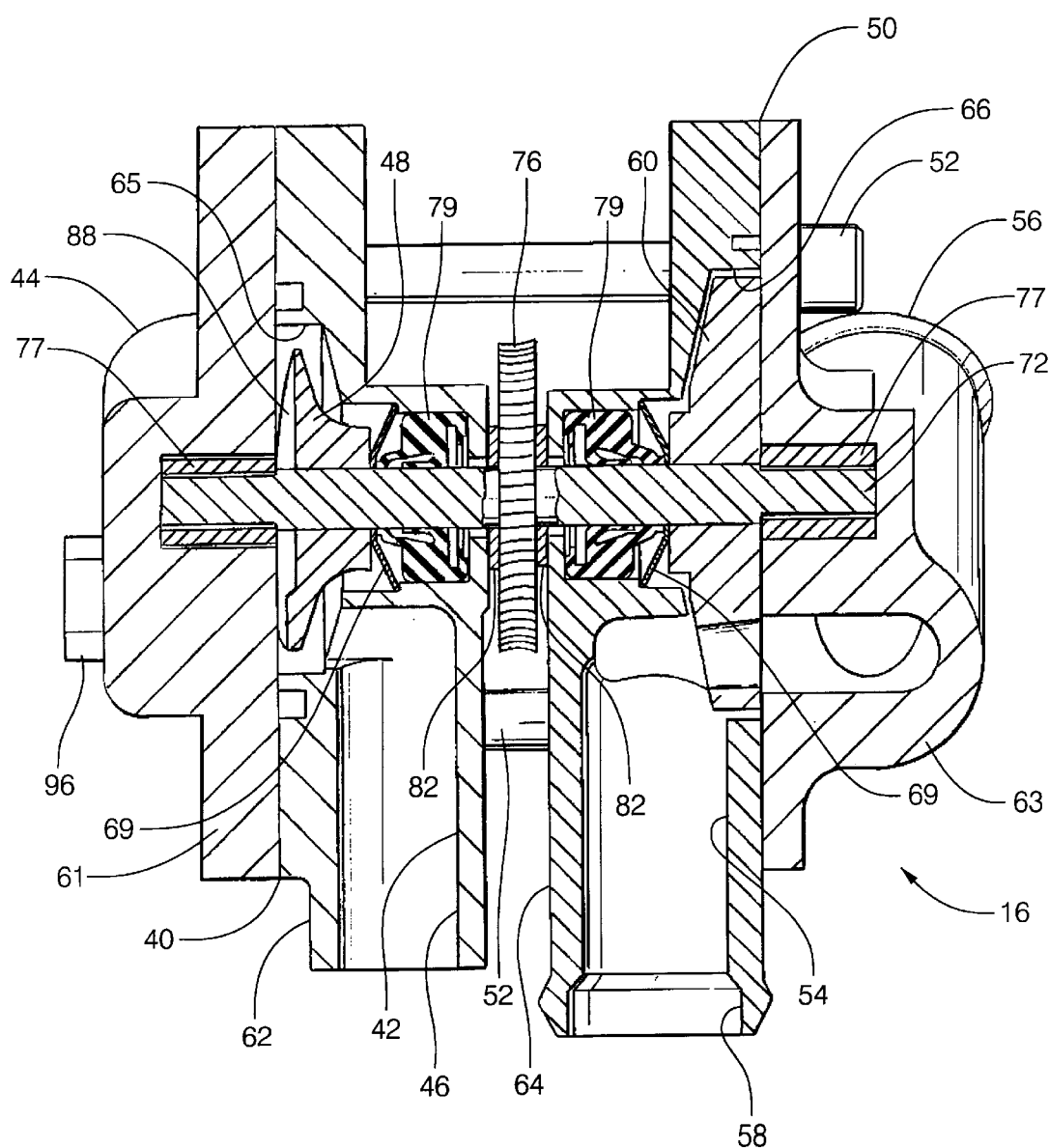
FIG. 4 is a cross-sectional view of the valve assembly taken along line 4—4 in FIG. 3.

Referring to FIGS. 2–4, valve assembly 16 of the present invention controls the flow of refrigerant and coolant through HVAC system 10. Assembly 16 has a refrigerant housing 40 that defines a refrigerant conduit 42 with a refrigerant inlet 44 and a refrigerant outlet 46, which are preferably threaded for receiving a threaded fitting on lines 20, 28. A refrigerant valve 48 (see FIG. 4), or circular shaped mask, is disposed within refrigerant conduit 42 for controlling the flow of refrigerant between refrigerant inlet 44 and refrigerant outlet 46. Refrigerant housing 40 and mask 48 are preferably constructed from aluminum, which is suitable for the high pressures (up to 350 psi) within the refrigerant system.

A coolant housing 50, which is secured to refrigerant housing 40 by fasteners 52, defines a coolant conduit 54 with a coolant inlet 56 and a coolant outlet 58. A coolant valve 60, or coolant mask, is disposed within coolant conduit 54 for controlling the flow of coolant between coolant inlet 56 and coolant outlet 58. Preferably, coolant housing 50 and mask 60 are constructed from a plastic such as nylon. The coolant system experiences much lower pressures (approximately 15–18 psi) than the refrigerant system.

Figure 5:
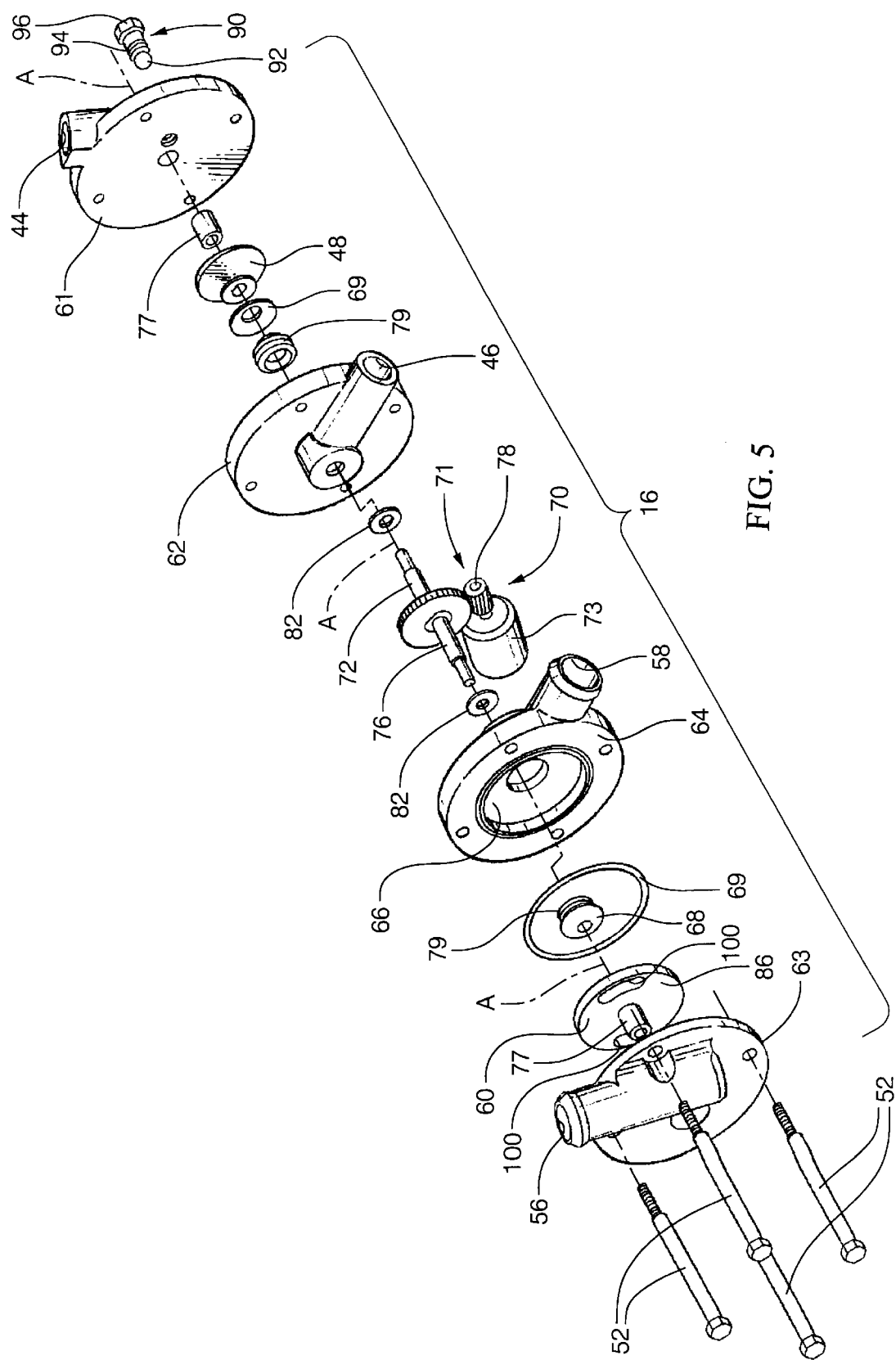
FIG. 5 is an exploded view of the valve assembly as shown in FIG. 3.
Figure 6:
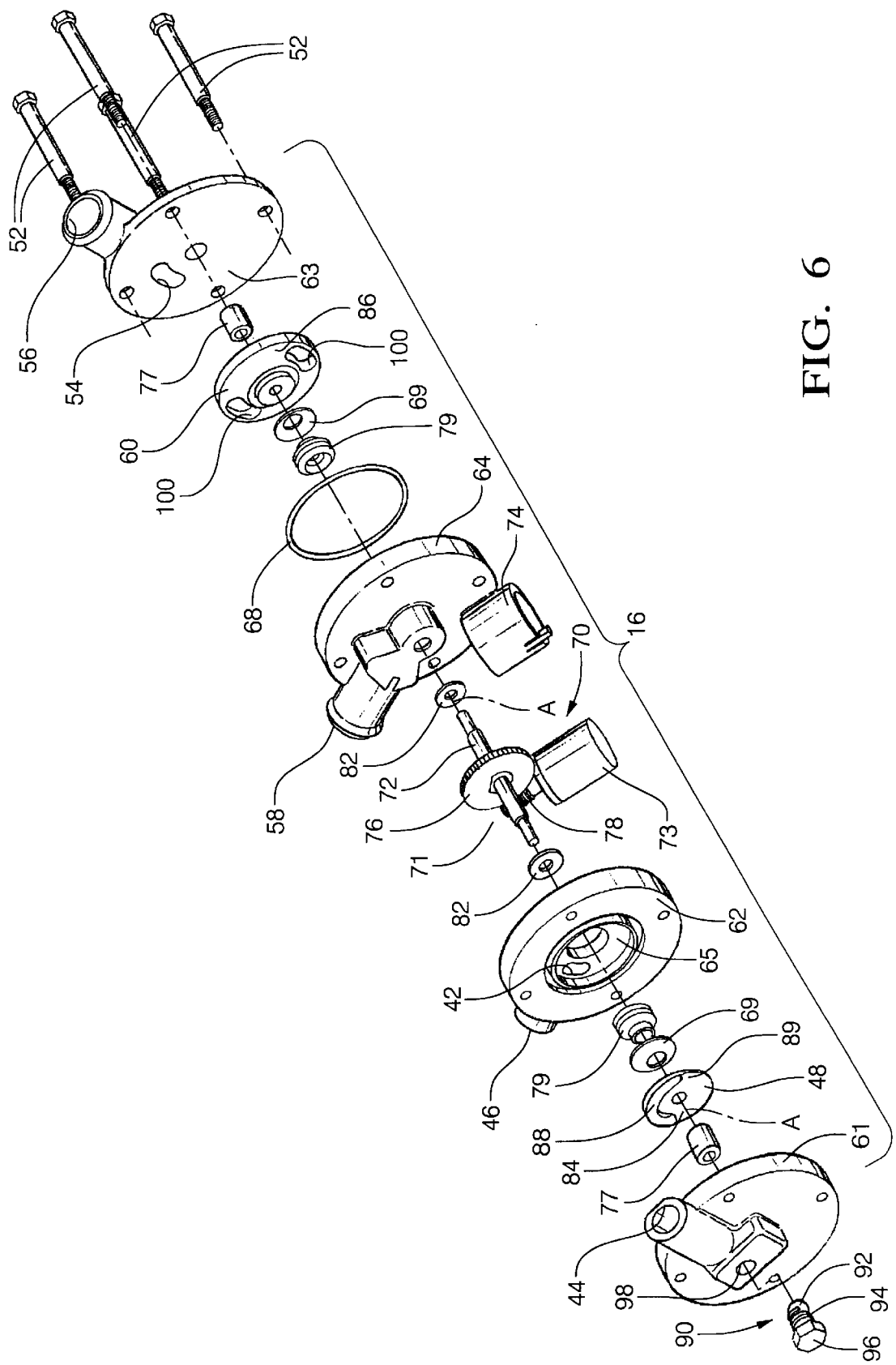
FIG. 6 is an exploded view of the valve assembly as shown in FIG. 2.

Referring now to FIGS. 5 and 6, refrigerant housing 40 includes outer 61 and inner 62 refrigerant housing members, and coolant housing 50 includes outer 63 and inner 64 coolant housing members. Inner members 62 and 64 have cavities 65, 66 that receive valves 48, 60, respectively. An annular rubber seal 68 is interposed between the plastic coolant housing members to prevent leakage of coolant. A pair of Belleville springs 69 each bias the refrigerant 48 and coolant 60 valves toward the refrigerant 61 and coolant 63 outer members. The refrigerant 61 and coolant 63 outer members have inlets 44, 56, respectively.

An actuator assembly 70 is disposed between housings 40, 50 and is coupled to refrigerant 48 and coolant 60 valves for simultaneously actuating valves 48, 60. Preferably, actuator assembly 70 includes a gear set 71, a shaft 72, and an electric motor 73. With the present invention, power need only be supplied to electric motor 73 when changing between valve positions, as will be better appreciated from the discussion below. A motor housing 74 is supported by one or both of the housings 40, 50 and supports electric motor 73. Valves 48, 60 are rotatable about a common axis A, and valves 48, 60 are secured to one another by shaft 72 that is coaxial with axis A. Shaft 72 is supported in housings 40, 50 by bushings 77 and may be secured to valves 48, 60 by a keyway. Rubber seals 79 seal between shaft 72 and inner housing members 62, 64. Shaft 72 has a gear 76 secured thereto, and electric motor 73 has a worm 78 for driving gear 76. A pair of washers 82 are disposed about gear 76 to provide a bearing surface. Due to the small size of electric motor 73, gear 76 may have a large diameter to produce a sufficient amount of torque.

Electric motor 73 drives shaft 72 and valves 48, 60 about axis A to rotate refrigerant valve 48 and coolant valve 60 between refrigerant and coolant, respectively, open and closed positions. The valves 48, 60 open and close refrigerant 42 and coolant 54 conduits using a control portion 84, 86 respectively on each valve 48, 60 that is spaced radially from axis A. Since the refrigerant is under high pressures, control portion 84 utilizes an arcuate profile 88 on a surface 89 of valve 48 to coact with a check valve 90, which is disposed within refrigerant conduit 42. Profile 88 is adjacent to check valve 90 so that it may move check valve 90 between open and closed positions. Profile 88 is tapered on either side so that less force is required to displace check valve 90. Check valve 90, which is located within a hole 98 that intersects refrigerant conduit 42, ensures that no refrigerant will leak past valve 48. Preferably, check valve 90 includes a ball 92, a spring 94 for biasing ball 92 to the refrigerant closed position, and a threaded fastener 96 for retaining ball 92 and spring 94 within hole 98.

Control portion 86 on coolant valve 60 includes a pair of opposing arcuate orifices 100 radially spaced from axis A. Orifices 100 align with coolant conduit 54 and fluidly connecting inlet 56 and outlet 58 when valve 60 is in an open position. A check valve is not necessary in coolant conduit 54 since the coolant is under low pressure and biasing spring 69 provides sufficient sealing between valve 60 and outer coolant housing member 63.

Actuator assembly 70 has a plurality of operational positions in which the refrigerant and coolant valves 48, 60 may be opened or closed at the same or different times, as discussed in more detail below. In the embodiment shown, there are four distinct operational positions, which are preferably spaced ninety degrees apart. Therefore, it is preferable that electric motor 73 be a servomotor having positional memory. In this manner, each time actuator assembly 70 is actuated, servomotor 73 will index valves 48, 60 to one of the four positions thereby only requiring power when changing between valve positions. However, it is to be understood that actuator assembly 70 may produce an infinite amount of operational positions to provide a more finely controlled climate by mixing the volumes of the refrigerant and coolant to their respective cores 26, 28. Additionally, it may be desirable to provide a reversible motor so that the motor 73 may index the valves 48, 60 using the most direct direction to the desired position.

Each of the operational positions is depicted in FIGS. 7A–10B. A first operational position, shown in FIGS. 7A and 7B, is at zero degrees of rotation in which refrigerant valve 48 and coolant valve 60 are in the open positions. As shown in FIG. 7A, one of the orifices 100 is aligned with coolant conduit 54 to permit coolant to flow from inlet 56 to outlet 58. Profile 88 displaces ball 92 to permit refrigerant to flow from inlet 44 to outlet 46, as shown in FIG. 7B. Refrigerant flows around the displaced ball 92 and past the tapered portion of the profile 88.

When the motor 73 actuates valves 48 and 60 together to a second operational position shown in FIGS. 10A and 10B, the valves 48, 60 are rotated ninety degrees so that refrigerant valve 48 is in the open position and coolant valve 60 is in the closed position. In this position, coolant valve 60 blocks conduit 54, as shown in FIG. 8A. Profile 88 maintains ball 92 in the open position, as depicted in FIG. 8B.

A third operational position, which is 180 degrees from the first operational position, positions refrigerant valve 48 to the closed position and coolant valve 60 to the open position. As shown in FIG. 9A, orifice 100 aligns with coolant conduit 54 to permit coolant to flow from inlet 56 to outlet 58. Profile 88 is in spaced relation from ball 92 thereby permitting spring 94 to bias ball 92 to the closed position, which is shown in FIG. 9B.

When the motor 73 actuates valves 48 and 60 together to a fourth operational position shown in FIGS. 8A and 8B, the valves 48, 60 are rotated ninety degrees from the third operational position so that refrigerant valve 48 and coolant valve 60 are in the closed positions. In this position, coolant valve 60 blocks conduit 54, as shown in FIG. 10A. Profile 88 is in spaced relation from ball 92 thereby permitting spring 94 to bias ball 92 to the closed position, which is shown in FIG. 10B.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A valve assembly for controlling the flow of refrigerant and coolant through an HVAC system, said assembly comprising:
   a refrigerant housing defining a refrigerant conduit with a refrigerant inlet and a refrigerant outlet;
   a refrigerant valve disposed within said refrigerant conduit for controlling the flow of refrigerant between said refrigerant inlet and said refrigerant outlet;
   a coolant housing defining a coolant conduit with a coolant inlet and a coolant outlet;

a coolant valve disposed within said coolant conduit for controlling the flow of coolant between said coolant inlet and said coolant outlet; and an actuator assembly coupled to said refrigerant and said coolant valves for simultaneously actuating said valves.

2. The assembly as set forth in claim 1 wherein said refrigerant valve comprises a refrigerant mask rotatable about an axis between refrigerant open and closed positions.

3. The assembly as set forth in claim 2 wherein said assembly further comprises a check valve disposed within said refrigerant conduit, and wherein said refrigerant mask further includes a surface having a profile adjacent said check valve for coacting with said check valve and moving said check valve between said refrigerant open and closed positions.

4. The assembly as set forth in claim 3 wherein said check valve comprises a ball and a spring biasing said ball to said refrigerant closed position.

5. The assembly as set forth in claim 2 wherein said mask comprises aluminum.

6. The assembly as set forth in claim 2 wherein said coolant valve comprises a coolant mask rotatable about said axis between coolant open and closed positions.

7. The assembly as set forth in claim 6 wherein said coolant includes an orifice radially spaced from said axis for aligning with said coolant conduit and fluidly connecting said coolant inlet and said coolant outlet when said coolant mask is in a coolant open position.

8. The assembly as set forth in claim 6 wherein said coolant mask comprises plastic.

9. The assembly as set forth in claim 6 wherein said assembly further comprises a pair of springs each biasing said refrigerant and coolant masks toward said refrigerant and coolant inlets respectively.

10. The assembly as set forth in claim 6 wherein said actuator assembly includes a shaft coaxial with said axis and secured to said masks for rotating said masks about said axis when actuated.

11. The assembly as set forth in claim 10 wherein said actuator assembly further includes an electric motor for rotating said shaft.

12. The assembly as set forth in claim 11 wherein said shaft has a gear secured thereto and said electric motor has a worm for driving said gear.

13. The assembly as set forth in claim 11 wherein said electric motor is disposed between said housings.

14. The assembly as set forth in claim 11 wherein said electric motor is a servomotor having positional memory.

15. The assembly as set forth in claim 14 wherein said electric motor is reversible.

16. The assembly as set forth in claim 15 wherein said actuator assembly has a plurality of operational positions.

17. The assembly as set forth in claim 16 wherein said plurality of operational positions comprises four distinct operational positions.

18. The assembly as set forth in claim 17 wherein a first operational position comprises said refrigerant and said coolant open positions, a second operational position comprises said refrigerant open position and said coolant closed position, a third operational position comprises said refrigerant closed position and said coolant open position, and a fourth operational position comprises said refrigerant and said coolant closed positions.

19. The assembly as set forth in claim 1 wherein said HVAC system includes a rear module for a rear cabin portion of a vehicle, said valve assembly being adapted for use with said rear module.

20. A valve assembly for controlling the flow of a fluid through an HVAC system, said assembly comprising:

a refrigerant housing defining a fluid conduit with an inlet and a outlet;

a mask disposed within said fluid conduit and rotatable about an axis between open and closed positions for controlling the flow of fluid between said inlet and said outlet;

a control portion on said mask radially spaced from said axis for producing said open and closed positions; and an actuator assembly coupled to said mask for rotating said mask between said open and closed position.

21. The assembly as set forth in claim 20 wherein said assembly further comprises a check valve disposed within said fluid conduit, and wherein said control portion comprises a profile adjacent said check valve for coacting with said check valve and moving said check valve between said open and closed positions.

22. The assembly as set forth in claim 20 wherein said control portion comprises an orifice for aligning with said fluid conduit and fluidly connecting said inlet and said outlet when said mask is in a open position.

* * * * *